(12) United States Patent
Bank et al.

(10) Patent No.: US 9,697,502 B2
(45) Date of Patent: Jul. 4, 2017

(54) ENFORCING E-MEETING ATTENDEE GUIDELINES

(75) Inventors: Judith Helen Bank, Morrisville, NC (US); Liam Harpur, Skerries (IE); Ruthie D. Lyle, Durham, NC (US); Patrick Joseph O'Sullivan, Ballsbridge (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 13/534,986

(22) Filed: Jun. 27, 2012

(65) Prior Publication Data

US 2014/0007245 A1   Jan. 2, 2014

(51) Int. Cl.
*G06F 21/62* (2013.01)
*G06Q 10/10* (2012.01)

(52) U.S. Cl.
CPC ....... *G06Q 10/1093* (2013.01); *G06F 21/629* (2013.01); *G06F 21/6218* (2013.01); *G06F 2221/2111* (2013.01)

(58) Field of Classification Search
CPC ......... G06Q 10/1093; G06F 2221/2111; G06F 2221/21; G06F 21/121; G06F 21/123
USPC ....................................................... 726/26
See application file for complete search history.

(56) References Cited

U.S. PATENT DOCUMENTS

| | | | |
|---|---|---|---|
| 7,707,262 B1* | 4/2010 | Bill | G06Q 10/00 709/204 |
| 7,929,960 B2 | 4/2011 | Martin et al. | |
| 2005/0114514 A1* | 5/2005 | Bostrom et al. | 709/227 |
| 2006/0190547 A1* | 8/2006 | Bhogal et al. | 709/207 |
| 2007/0245026 A1* | 10/2007 | Martin | G06F 21/629 709/227 |
| 2010/0146499 A1* | 6/2010 | Bush et al. | 717/178 |
| 2010/0313239 A1* | 12/2010 | Chakra et al. | 726/2 |

OTHER PUBLICATIONS

IBM, System and Method to Orchestrate Behavior in eMeetings, Jul. 24, 2008, IP.com.*

* cited by examiner

*Primary Examiner* — Ellen Tran
(74) *Attorney, Agent, or Firm* — Brian J. Colandreo, Esq.; Jeffrey T. Placker, Esq.; Holland & Knight LLP

(57) ABSTRACT

A method, computer program product, and system for enforcing eMeeting guidelines is described. An indication of one or more use restriction guidelines is received. The one or more use restriction guidelines is associated with an electronic communication session. The one or more use restriction guidelines is provided to a computing device associated with an invitee associated with the electronic communication session. An indication is received that the invitee has accepted a portion of the one or more use restriction guidelines. The portion of the one or more use restriction guidelines is enforced with respect to one or more devices associated with the invitee.

17 Claims, 8 Drawing Sheets

| Attendee Guidelines / Participants | No IM | No Email | No desk phone | No mobile phone | No browser | Only related software |
|---|---|---|---|---|---|---|
| Lisa (chair) | | | | | | X |
| Pam | | | | | | X |
| Jake | X | X | X | X | | |
| Lucas | X | X | X | X | | |
| Roger | X | X | X | X | | |

FIG. 3

| Attendee Guidelines Duration / Participants | Entire Meeting | Selective Meeting Slot | First 30 Minutes |
|---|---|---|---|
| Lisa(chair) | X | | |
| Pam | X | | |
| Jake | | X | |
| Lucas | | X | X |
| Roger | | | |

FIG. 4

ENFORCING E-MEETING ATTENDEE GUIDELINES

TECHNICAL FIELD

This disclosure relates to electronic meetings.

BACKGROUND

Electronic communication may provide an efficient or otherwise useful way to achieve business, personal, or other objectives. Through electronic meetings ("eMeetings"), such as electronic learning ("eLearning") sessions, group audio- and video-conferencing and various other formats, participants and moderators can exchange information without the need to travel to a single physical location.

BRIEF SUMMARY OF THE DISCLOSURE

According to a first aspect of the disclosure, a computer-implemented method includes receiving, by one or more computing devices, an indication of one or more use restriction guidelines. The method further includes associating, by the one or more computing devices, the one or more use restriction guidelines with an electronic communication session. The method further includes providing, by the one or more computing devices, the one or more use restriction guidelines to a computing device associated with a first invitee associated with the electronic communication session. The method further includes receiving, by the one or more computing devices, an indication that the first invitee has accepted a portion of the one or more use restriction guidelines. The method further includes enforcing, by the one or more computing devices, the portion of the one or more use restriction guidelines with respect to one or more electronic devices associated with the first invitee.

One or more of the following features may be included. The one or more use restriction guidelines may include restricting access to one or more websites. The one or more use restriction guidelines include restricting access to one or more applications. Restricting access to one or more of one or more websites and one or more applications may be based upon, at least in part, content associated with one or more of the one or more websites and the one or more applications. The one or more use restriction guidelines may be based upon, at least in part, one or more of geographical location information and enterprise hierarchy information. The method may further include identifying one or more portions of the electronic communication session and enforcing the one or more use restriction guidelines only during the one or more portions of the electronic communication session. Determining the one or more use restriction guidelines may be based upon, at least in part, past conduct of one or more of the first invitee and a second invitee.

According to another aspect of the disclosure, a computer program product resides on a computer readable storage medium and has a plurality of instructions stored on it. When executed by a processor, the instructions cause the processor to perform operations including receiving an indication of one or more use restriction guidelines. The operations further include associating the one or more use restriction guidelines with an electronic communication session. The operations further include providing the one or more use restriction guidelines to a computing device associated with a first invitee associated with the electronic communication session. The operations further include receiving an indication that the first invitee has accepted a portion of the one or more use restriction guidelines. The operations further include enforcing the portion of the one or more use restriction guidelines with respect to the one or more electronic devices associated with the invitee.

The one or more use restriction guidelines may include restricting access to one or more websites. The one or more use restriction guidelines include restricting access to one or more applications. Restricting access to one or more of one or more websites and one or more applications may be based upon, at least in part, content associated with one or more of the one or more websites and the one or more applications. The one or more use restriction guidelines may be based upon, at least in part, one or more of geographical location information and enterprise hierarchy information. The plurality of instructions, when executed by the processor, may cause the processor to perform further operations including identifying one or more portions of the electronic communication session and enforcing the one or more use restriction guidelines only during the one or more portions of the electronic communication session. Determining the one or more use restriction guidelines may be based upon, at least in part, past conduct of one or more of the first invitee and a second invitee.

According to another aspect of the disclosure, a computing system includes at least one processor and at least one memory architecture coupled with the at least one processor. The computing system also includes a first software module executable by the at least one processor and the at least one memory architecture, wherein the first software module is configured to receive an indication of one or more use restriction guidelines. The computing system also includes a second software module executable by the at least one processor and the at least one memory architecture, wherein the second software module is configured to associate the one or more use restriction guidelines with an electronic communication session. The computing system also includes a third software module executable by the at least one processor and the at least one memory architecture, wherein the third software module is configured to provide the one or more use restriction guidelines to a computing device associated with a first invitee associated with the electronic communication session. The computing system also includes a fourth software module executable by the at least one processor and the at least one memory architecture, wherein the fourth software module is configured to receive an indication that the first invitee has accepted a portion of the one or more use restriction guidelines. The computing system also includes a fifth software module executable by the at least one processor and the at least one memory architecture, wherein the fifth software module is configured to enforce the portion of the one or more use restriction guidelines with respect to one or more electronic devices associated with the invitee.

One or more of the following features may be included. The one or more use restriction guidelines may include restricting access to one or more of one or more websites and one or more applications. Restricting access to one or more of one or more websites and one or more applications may be based upon, at least in part, content associated with one or more of the one or more website and the one or more applications. The one or more use restriction guidelines may be based upon, at least in part, one or more of geographical location information and enterprise hierarchy information. The computing system may include a sixth software module executable by the at least one processor and the at least one memory architecture, wherein the sixth software module is configured to identify one or more portions of the electronic communication session. The computing system may include a seventh software module executable by the at least one processor and the at least one memory architecture, wherein the seventh software module is configured to enforce the one or more use restriction guidelines only during the one or more portions of the electronic communication session. Determining the one or more use restriction guidelines may be based upon, at least in part, past conduct of one or more of the first invitee and a second invitee.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 3 is a diagrammatic view of a first aspect of an implementation of the eMeeting guideline enforcement process of FIG. 1.

FIG. 4 is a diagrammatic view of a second aspect of an implementation of the eMeeting guideline enforcement process of FIG. 1;

Like reference symbols in the various drawings indicate like elements.

DETAILED DESCRIPTION OF THE PREFERRED EMBODIMENTS

Figure 1:
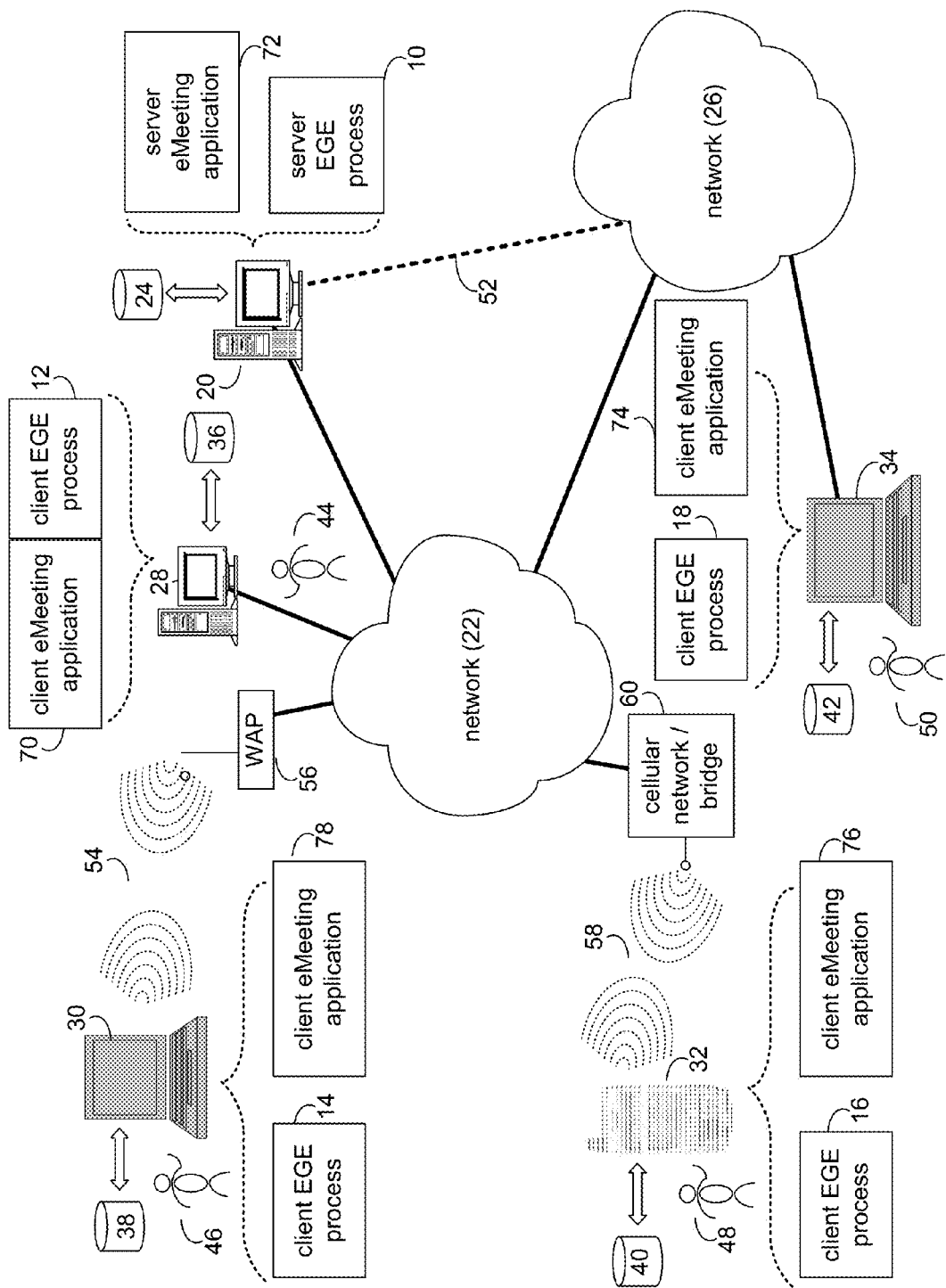
FIG. 1 is a diagrammatic view of an eMeeting guideline enforcement process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Many individuals and organizations find value in communicating via electronic means. For example, business associates or other individuals, rather than traveling to the same physical location may prefer to communicate through an electronic communication session (sometimes also referred to, generically, as an "eMeeting") in which they may exchange text, audio, video or other information over electronic channels. It will be understood that eMeetings may take a variety of formats. As one example, eMeetings may include eLearning sessions, in which one or more subject matter experts may provide instructions to an audience of listeners. In certain embodiments, eLearning sessions may allow active participation from the listeners, including posting of comments, asking of questions, participation in discussions through text, audio or video communication, and so on. As another example, an eMeeting may include a video- or tele-conference among multiple members of a business organization. Participants in this type of eMeeting may also exchange audio, video and other information via electronic means in order to facilitate effective communication despite the remote location of certain participants. It will be understood that eMeeting communication may occur over a variety of electronic communication channels, including landlines, cellular telephone networks, wireless networks, the world wide web, private networks and so on, and through a variety of means, including traditional telephony, instant messenger communication, voice over internet protocol (VoIP) communication, and so on. It will be further understood that a participant may be referred to as an "invitee," regardless of whether or no the participant receives a specific invitation of a particular form to attend the eMeeting.

At times, it may be desirable to impose restrictions on participants of an eMeeting. For example, because participants in an eMeeting are often remote from other participants, they may easily become distracted by other applications, websites, phone calls, emails, and so on, which may be detrimental to the effectiveness of the eMeeting. For example, a participant in a business video-conference facilitated by VoIP technology may participate in the video-conference via a computer located in her personal office. As such, she may be tempted to browse unrelated websites, read and respond to unrelated emails, accept unrelated incoming phone calls, or engage in other distracting computing activity (e.g., performing various unrelated or otherwise inappropriate tasks with various applications accessible via her computer or another electronic device). Similarly, students in an eLearning session may become distracted by access to the wide variety of web pages on the World Wide Web as well as phone calls, text messages, instant messages, and various computer applications. It will be understood that this list of distractions is exemplary, that many other types of distractions associated with electronic devices may occur related to an eMeeting or eMeeting participant, and that each type of distraction may affect one or more participants in each type of eMeeting session. Accordingly, in some instances it may be desirable to impose restrictions on the use of electronic devices by participants in an eMeeting. This may be accomplished, for example, by an eMeeting Guideline Enforcement (EGE) process.

Referring now to FIG. 1, a EGE process may be coupled to a computer or computer network. For example, server EGE process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server EGE process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server™, or Apache® Tomcat®, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache and Tomcat are registered trademarks of Apache Software Foundation in the United States, other countries, or both; Lotus and Sametime are registered trademarks of International Business Machine Corporation in the United States other countries, or both.) Network 22 may be connected to one or more secondary networks (e.g., network 26), examples of which may include but are not limited to: a local area network; a wide area network; or an intranet, for example.

In addition/as an alternative to server EGE process 10, one or more client EGE processes (e.g., client EGE processes 12, 14, 16, 18) may reside on and may be executed by one or more client electronic devices (e.g., client electronic devices 28, 30, 32, and/or 34, respectively). Accordingly, in some embodiments, the EGE process may be a server-side process, in which all of the functionality may be performed on server computer 20. Further, the EGE process may be a client-side process, in which all of the functionally may be performed on a client electronic device. In still further embodiments, the EGE process may include a hybrid server-client process, in which at least some of the functionality may be performed by a server device and at least some of the functionality may be performed by a client device.

Examples of client electronic devices may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CEO, Red Hat® Linux®, or a custom operating system.

The instruction sets and subroutines of client EGE processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In order to facilitate participation in an eMeeting, an eMeeting application may operate on a client device (e.g., client eMeeting application 78, operating on client electronic device 30; client eMeeting application 70, operating on client electronic device 28; client eMeeting application 74, operating on client electronic device 34; or client eMeeting application 76, operating on client electronic device 32). A client EGE process (e.g., client EGE process 14) or a server EGE process (e.g., server EGE process 10) may be in communication with a client eMeeting application (e.g., client eMeeting application 78) or may be part of the client eMeeting application.

An eMeeting application may additionally or alternatively operate on a server device (e.g., server eMeeting application 72, operating on server computer 20). A server EGE process (e.g., server EGE process 10) or a client EGE process (e.g., client EGE process 14) may be in communication with a server eMeeting application (e.g., server eMeeting application 72) or may be a part of the server eMeeting application.

An eMeeting application may permit participants in an eMeeting to exchange information in various ways and may be any type of application that facilitates electronic communication. An eMeeting application may include an application to facilitate one or more of VoIP communication, text message or instant message communication, telephonic communication, video-conferencing communication, and so on. For example, an eMeeting application may include an application such as IBM Sametime® (IBM and Sametime are trademarks of International Business Machine Corporation in the United States, other countries, or both.) In certain embodiments, an eMeeting application may facilitate communication using multiple communication types, so as to provide a richer eMeeting environment. For example, an eMeeting application may facilitate video-conferencing communication, VoIP communication, and instant messaging communication in order to allow eMeeting participants to converse while also viewing video of other participants and exchanging text comments (e.g., comments on subject matter viewable via a display associated with a VoIP link).

Users 44, 46, 48, 50 (also variously referred to as "invitees," "participants" or "moderators") may access an EGE process in various ways. For example, one or more of these users may access server EGE process 10 directly through the device on which a client process (e.g., client EGE processes 12, 14, 16, 18) is executed, namely client electronic devices 28, 30, 32, 34. Users 44, 46, 48, 50 may access server EGE process 10 directly through network 22 and/or through secondary network 26. Further, server computer 20 (i.e., the computer that executes server EGE process 10) may be connected to network 22 through secondary network 26, as illustrated with phantom link line 52. Users 44, 46, 48, 50 may also access an eMeeting application in similar ways.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client EGE process 12 will be described for illustrative purposes. It will be understood that client EGE process 12 may, for example, be interact and/or communicate with server EGE process 10 and/or may be executed within one or more applications that allow for communication with other server and/or client EGE processes. This is not intended to be a limitation of this disclosure, as other configurations are possible (e.g., EGE process 12 may include stand-alone client processes and/or stand-alone server processes.) For example, some implementations may include one or more of client EGE processes 14, 16, 18 or server EGE process 10 in place of or in addition to client EGE process 12.

Figure 2:
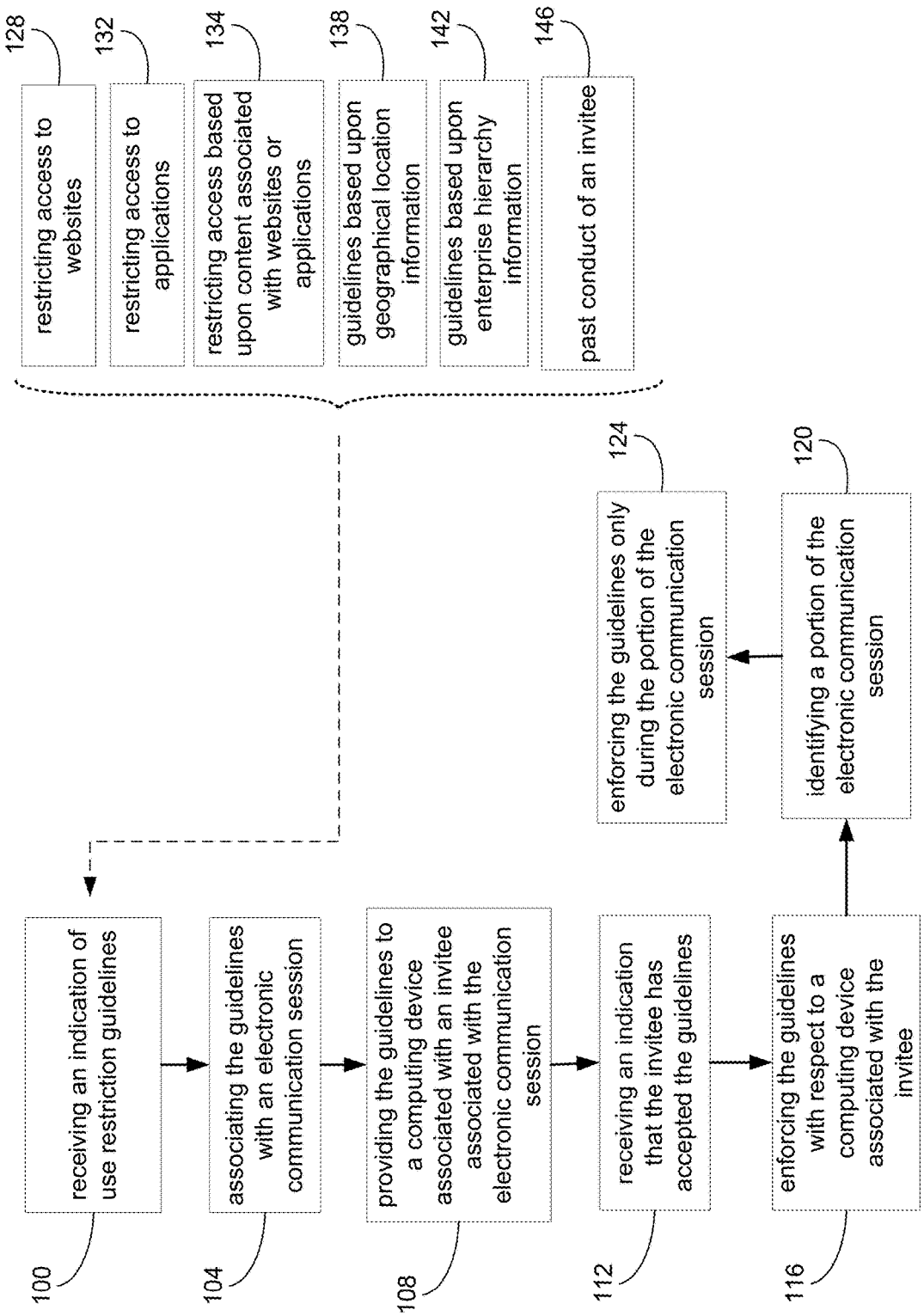
FIG. 2 is a flowchart of a process executed by the eMeeting guideline enforcement process of FIG. 1.

Referring now also to FIG. 2, there is shown a diagrammatic view of a process implemented by an EGE process, e.g., client EGE process 12. Client EGE process 12 may receive 100 an indication of one or more use restriction guidelines and associate 104 the guidelines with an electronic communication session. A restriction guideline may be determined in a variety of ways. In certain embodiments, receiving 100 a use restriction guideline and associating 104 the guideline with an eMeeting may be based upon an input of a participant or moderator. For example, in one embodiment, a restriction guideline may be associated with an electronic invitation to attend an eMeeting. For example, using Lotus Notes®, a moderator of a meeting (also sometimes referred to as an administrator), or a delegate of a moderator, may invite selected participants to a particular eMeeting. (Lotus and Lotus Notes are trademarks of International Business Machines Corporation in the United States, other countries or both.) As part of such an invitation, a moderator may sometimes include certain use restrictions (e.g., via a selection menu or some other suitable interface) associated with the eMeeting and one or more participants. EGE process 12 may, for example, receive (e.g., based on an input provided by the moderator) information associated with such an eMeeting invitation including information associated with the associated use restriction guidelines, and in this way receive 100 an indication of use restriction guidelines. Continuing with this example, EGE process 12 may also associate 104 the received 100 guidelines the eMeeting for which the particular invitation was sent, based upon the inclusion of those use restrictions in the eMeeting invitation. (It will be understood that EGE process 12 may itself facilitate sending of invitations to eMeetings, may be incorporated into an application that facilitates sending of invitations to eMeetings, and/or may receive information from an application that facilitates sending of invitations to eMeetings. It will be further understood that, for example, in addition to the scenario above in which EGE process 12 associates 104 guidelines with an eMeeting in conjunction with the inclusion of the guidelines in an invitation for that eMeeting, EGE process 12 may also associate 104 guidelines with an eMeeting that has no invitation or for which an invitation was previously sent—i.e., an eMeeting that has already been scheduled when EGE process 12 receives 100 an indication of use restriction guidelines.)

As another example, EGE process 12 may sometimes receive 100 an indication of use restriction guidelines based upon a participant or moderator inputting use restriction guidelines as part of a setup (or other) process associated with an eMeeting. For example, an administrator may sometimes create an "open" eLearning session—i.e., an eMeeting in which participants may be informed of the eMeeting's time and subject matter but may not receive a fully detailed invitation and/or an invitation to which a response is requested, required or possible. In this example, the participant or moderator may input the use restriction guidelines while setting initial parameters of the eLearning session rather than while creating user-specific invitations to the eMeeting. EGE process 12 may then, for example, associated 104 the guidelines with the eLearning session based upon the input of the participant or moderator.

As another example, EGE process 12 may sometimes receive 100 an indication of use restriction guidelines based upon a moderator or participant entering use restriction guidelines during an eMeeting that is already in progress. For example, a moderator or participant may determine that one or more types of participant activities are causing undesirable disruption to the ongoing eMeeting and that use restriction guidelines may be an appropriate way to prevent continued disruption. In this case (and others), the moderator or participant may use, for example, an aspect of a user interface associated with the ongoing eMeeting to input use restriction guidelines for the ongoing eMeeting. EGE process 12 may determine the use restriction guidelines, at least in part, in response to the moderator inputting the use restriction guideline. In this example, EGE process 12 may associated 104 the guidelines with the ongoing eMeeting session based upon the input of the participant or moderator.

Continuing the previous examples, in certain embodiments EGE process 12 may also receive 100 an indication of use restriction guidelines and associate 104 the guidelines with an electronic communication session based upon, at least in part, previously determined use restriction guidelines associated with a previously occurring eMeeting. For example, if a moderator initiates an eMeeting that is similar to a previously-occurring eMeeting (e.g., has similar subject matter, purpose, participant roster, timing, and so on) EGE process 12 may receive 100 an indication of use restriction guidelines for the subsequent eMeeting (and associate 104 the use restriction guidelines with the subsequent eMeeting) based upon the use restriction guidelines associated with the similar previously-occurring eMeeting—i.e., may receive 100 an indication of and associate 104 use restriction guidelines that are similar to those determined for and associated with the previously occurring eMeeting.

In certain embodiments EGE process 12 may also receive 100 an indication of use restriction guidelines and associate 104 the guidelines with an electronic communication session independent of certain user input. For example, EGE process 12 may receive 100 an indication of and associate 104 use restriction guidelines based upon a set of default use restriction guidelines associated with a particular type of eMeeting, or based upon analysis of various data patterns, including, for example, past conduct 146 of an invitee, past success (or lack of success) of an eMeeting with which a particular set of use restriction guidelines was associated 104, and so on.

A restriction guideline may include a variety of guidelines that relate to participant behavior during an eMeeting. For example, a restriction guideline may include restricting access 128 to one or more websites. It may be determined, for example, that participants have no need to visit a particular set of websites during a particular eMeeting. For example, these websites may contain subject matter that is entirely irrelevant to the subject matter of the eMeeting and/or may contain various subject matter or functionality that may result in distraction of participants who visit those websites during the eMeeting. As such, EGE process 12 may receive 100 an indication of use restriction guidelines that prevent access by participants to all or part of these websites.

As another example, the one or more websites for which access is restricted 128 may be determined as a negative of a subset of useful websites. For example, a moderator may determine that a particular set of websites may include material and/or functionality that may be useful to one or more participants in an eMeeting. (it will be understood that a moderator may be a participant and vice versa and that reference to a moderator—or participant—in this disclosure may also include an implicit reference to a participant—or moderator.) In this example, EGE process 12 may receive 100 an indication of the use restriction guidelines that include restricting 128 access to a one or more websites not included in a listing of websites determined to be useful to participants in the particular eMeeting (e.g., all websites that are not part of the useful set of websites).

In one embodiment, as part of EGE process 12, the list of websites (or portions of websites) that a participant may (or may not) access may be displayed to the participant. For example, the list of permitted websites (or portions of websites) may be displayed to a participant when the participant receives an invitation to the eMeeting, or the list may be displayed to the participant when the participant interacts with a web browser application (or another application, e.g., an application including or interacting with EGE process 12) in various ways.

As another example, one or more use restriction guidelines may include restricting access 132 to one or more applications. In this context, "application" may refer to any type of computer, or computing-device, program or functionality. As one example, EGE process 12 may restrict access 132 to a particular type of program, e.g., email applications, IM or chat applications, VoIP applications, web-browser applications, game applications, and so on. This may be useful in order to minimize distractions to participants in an eMeeting. For example, although a participant may find the subject matter of an eMeeting to be interesting or useful, she may be tempted to check her email (particularly if incoming email notifications appear to alert her to new messages), to browse unrelated websites, to play games available through her computing device, to chat with friends or coworkers using an electronic chat application, to engage in VoIP-enabled conversations, and so on. By restricting access 132 to one or more applications, EGE process 12 may remove the ability of a participant to become distracted by these and other applications.

In one embodiment, the list of applications (or portions of applications) that a participant may access may be displayed to the participant. For example, the list of permitted applications (or portions of websites) may be displayed to a participant when the participant receives an invitation to the eMeeting, or the list may be displayed to the participant when the participant interacts with a particular application or other interface.

In the case of restricting access 128 to one or more websites and/or restricting access 132 to one or more applications, it will be understood that EGE process 12 may receive 100 an indication of use restriction guidelines that restrict access 128, 132 to one or more portions of a given application or website. For example, it may be determined that it will be useful for a participant to view incoming email (or incoming email notifications) but not to compose new or response emails during a particular eMeeting. This may, for example, permit the participant to monitor other business activity in order to be aware of any crises or other issues that arise during the eMeeting, but not to actively engage with those crises or issues—i.e., by responding to or composing emails—without leaving the eMeeting. As another example, it may be determined that a particular website includes both useful and distracting content. As such, EGE process 12 may receive 100 an indication of use restriction guidelines that restrict access 128 to the website such that a participant may view (and/or interact with) the portions of the particular website that are useful, but may not view (and/or interact with) the portions of the particular website that are distracting.

In certain embodiments, restricting access 128, 132 to one or more websites and/or one or more applications may be based upon, at least in part, content associated with one or more of the subset of websites and the subset of applications. For example, continuing the previous examples, a particular website may include content that is related to the subject matter of a particular eMeeting as well as subject matter that is unrelated to the subject matter of a particular eMeeting. In this case, EGE process 12 may receive 100 an indication of use restriction guidelines that permit a participant to access the related subject matter of the particular website, but may restrict access 128 to the unrelated subject matter of the website.

As another example, EGE process 12 may determine that certain documents (e.g., a particular Microsoft Word® or PowerPoint® document) may contain content relevant to the subject matter of a particular eMeeting while other documents do not contain relevant content. (Microsoft, Word and PowerPoint are registered trademarks of Microsoft Corporation in the United States, other countries, or both.) For example, these documents may have titles related to the subject matter of the meeting, or may have been sent as part of the eMeeting invitation. Accordingly, EGE process 12 may restrict access 132 to applications so as to allow use only of applications that permit viewing and/or editing of the identified relevant documents (or document types) and/or may allow only use of the editing/viewing applications to edit/view only to those identified documents that include relevant content.

As a further example, in many instances participants may have information relevant to a particular eMeeting contained in an email (or other) application. For example, participants may have exchanged emails, instant messages, and so on that are relevant to an eMeeting before the eMeeting began, may exchange communications relevant to the eMeeting during the eMeeting, or may have received information relevant to the eMeeting as part of a communication (e.g., an email) inviting the participant to the eMeeting. As such, although unlimited access to the email (or other) application may create unnecessary distractions during the eMeeting, some access to the (or other) email application may be desirable. Therefore, EGE process 12 may restrict access 132 to the email (or other) application so as to permit access only to those emails, calendar entries, notes, instant messages, calendar invitations and so on contained within (or viewable through) the email (or other) application that include relevant content. For example, EGE process 12 may permit access only to emails, calendar entries or notes instant messages, calendar invitations and so on that include particular text in a subject field, or with particular key words included in the email body (or other content field), or which had been sent from (or to) other participants of the eMeeting.

Similarly, incoming (or already received) emails, meeting invitations and so on may sometimes include indications of high importance or priority. For example, emails from supervisors or other management personnel may generally include important (and sometimes time-sensitive) information, or certain emails may include explicit indications of high importance (as indicated, for example, through the use of particular words in a subject line or in the email body, or through the use of a "high importance" indicator associated with the email). This content, by indicating actual or likely high importance may indicate that a participant should be allowed to view these emails during an eMeeting, even if the subject matter of the emails is unrelated to the subject matter of the eMeeting. Accordingly, EGE process 12 may restrict access 132 to the email application in such a way certain email functionality is not accessible to eMeeting participants, but high importance emails may still be viewed and/or responded to. (It will be understood that a similar analysis and treatment may be afforded to non-email communication, such as telephone communications, instant messages, and so on.)

Restricting access 134 based upon content (as well as other use restrictions) may be implemented in an absolute and/or in a conditional manner. For example, in one embodiment restricted content, websites, applications, and so on may simply not appear on the user interfaces of participants in an eMeeting. As an alternative example, restricted content, websites, applications, and so on may appear on the user interfaces of participants in an eMeeting but may be "grayed out" or otherwise altered in appearance so as to indicate that they (or a portion of their content) may not be accessible to a participant. As another example, restricted content, websites, applications, and so on may be conditionally accessible to participants in an eMeeting. For example, when a participant tries to open a restricted application or view restricted content, a message may appear alerting the participant that all or part of the application or content is not accessible due to use restriction guidelines associated with the ongoing eMeeting. The participant, in certain embodiments, may be presented with option including an option to not access the application or content, to contact an administrator in order to request access to the application or content (as may be useful, for example, if a participant identifies relevant content or functionality not accounted for by the original use restriction guidelines or the eMeeting currently is focused on subject matter that is not relevant to the participant), or to leave the eMeeting (permanently or temporarily) in order to access the restricted application or content.

EGE process 12 may receive 100 an indication of use restriction guidelines that restrict access 134 based upon content in a variety of ways. For example, EGE process 12 may permit a moderator to specify the subject matter of an eMeeting and, accordingly, the subject matter of applications and/or emails that may be accessed by participants during the eMeeting, or may determine the subject matter automatically (e.g., based upon keywords associated with the eMeeting, analysis of past eMeetings and past use restriction guidelines, and so on). EGE process 12 may also permit customization of content-based use restrictions for particular participants. For example, EGE process 12 may determine that a particular participant may be permitted to view emails from the participant's supervisor(s) (who may be a different individual from the supervisor of another participant) or a list of "trusted" individuals. As another example, EGE process 12 may determine that a moderator of an eMeeting may have particular need to respond to email questions from other participants in the eMeeting, but that certain participants should not be permitted to exchange emails with each other. Accordingly, EGE process 12 may restrict access 134 to an email application for the moderator so as to permit viewing of emails from other eMeeting participants, while restricting access 134 to email applications for the other participants so as not to permit viewing of similar emails.

It will be understood (as is discussed in part above) that use restriction guidelines may be determined 100 to be associated with all participants of an eMeeting or only with a particular subset of participants. For example, it may be determined that certain participants should be subject to one set of use restrictions, while other participants should be subject to a different set of use restrictions. The particular application of use restrictions to particular participants may be determined automatically, based upon data mining, artificial intelligence algorithms or other analysis, based upon input from a participant or moderator, or based upon a combination of automatic analysis and participant or moderator input.

As one example, one or more use restriction guidelines may be based upon geographical location information 138. For example, EGE process 12 may receive 100 an indication of one set of use restriction guidelines for a participant in an eMeeting located in one location (e.g., Tokyo, Japan) and may receive 100 an indication of a different set of use restriction guidelines for a participant located in a different location (e.g., Helena, Mont.). This geographically-based distinction in use restriction guidelines may be useful, for example, in the case that business units in different locations engage in different functions and therefore may have different interest-levels or different focus with relation to a particular eMeeting. Geographically-based distinctions in use restrictions may also allow for managing of cultural tendencies. For example, it may be determined that individuals in a particular cultural environment (including culture associated with business units) may be more or less accepting of particular use restriction guidelines or may be more or less likely to engage in particular types of distracting behavior.

As another example, one or more use restriction guidelines may be based upon enterprise hierarchy information 142. For example, EGE process 12 may receive 100 an indication of use restriction guidelines that are different for a particular level of managers than for a different level of managers or non-managerial employees. Similarly, when restricting access 132 to one or more applications includes restricting access 132 to email applications, use restrictions guidelines may, for example, be customized for a given participant to permit access to emails associated with that participant's supervisor(s) or subordinate(s) and so on.

In one embodiment, receiving 100 an indication of use restriction guidelines may be based upon past conduct of an invitee/participant 146. For example, data mining, artificial intelligence algorithms, input from a moderator, or other factors may indicate that a given participant (or type of participant) tends to be distracted with regularity by a particular website or application, that participants (or a type of participants) in a particular type of meeting tend to be distracted by particular websites or applications, or that certain participants tend to be more distracted at a particular point in an eMeeting or around a particular time of day. EGE process 12 may receive 100 an indication of use restriction guidelines for a current eMeeting based upon these patterns of past distracted (or distracting) behavior. As a specific example, it may be determined that a particular participant tends to use his email with very high frequency during eMeetings. As such, EGE process 12 may receive 100 an indication of that this individual's use of email should be restricted in whole or in part—e.g., with respect to a particular subset of recipients or topics or to a preset total usage time. As another example, it may be determined that participants in past eLearning sessions tended to be distracted by access to an internet browser application or a particular type of website (e.g., a social video website) during only the lecture portion of the eLearning session. Accordingly, EGE process 12 may receive 100 an indication of use restriction guidelines for participants in a current eLearning session that include restricting access 128 to the identified set of distracting websites or restricting access 132 to web browser applications during the lecture.

EGE process 12 may also include providing 108 the one or more use restriction guidelines to a computing device associated with an invitee (i.e. participant) associated with the electronic communication session. For example, if an invitation to an eMeeting is sent to a participant (e.g., sent to the participant's desktop computer) using an application such as Lotus Notes®, the use restriction guidelines for the particular participant may be displayed as a "contract" for the particular eMeeting. For example, the participant may receive an indication through the invitation that by accepting the invitation to the eMeeting she accepts that she will be bound by the specified use restrictions while she participates in the eMeeting. As another example, if a participant attempts to join an "open" eMeeting, she may be presented (e.g., via the participant's computer monitor) with an indication that particular use restrictions may apply if she joins the eMeeting. By entering the eMeeting, the participant may thereby accept these use restrictions for the duration of her participation in the eMeeting. It will be understood that use restriction guidelines may apply universally to all eMeeting participants or may apply differently to different participants. As such, EGE process 12 may provide 108 to a computing device associated with a particular participant the guidelines associated with the entire eMeeting and/or the guidelines associated with the particular participant.

In one embodiment, providing 108 the guidelines may be the first step in a negotiation process associated with the use restriction guidelines. For example, upon viewing a set of use restriction guidelines a user may determine that one or more of the guidelines are inappropriate or unacceptable for her. For example, if one use restriction guideline prevents receiving all phone calls and emails but the participant is expecting a critically important phone call or email during the time the eMeeting is scheduled to occur, the participant may feel unable to agree to that particular use restriction. However, the participant may also strongly desire to participate in the eMeeting, and may be, in one example, a key participant in the eMeeting (e.g., an important presenter, or a subject matter expert). As such, the participant, upon receipt of the use restriction guidelines, may enter a negotiation whereby the participant indicates, for example, the portion of the user restriction guidelines the participant finds objectionable as well as the reasons for the participant's objections and, potentially, a proposed alternative use restriction guideline. For example, a participant expecting an important phone call may reply the initial set of use restriction guidelines by proposing that she be permitted to receive phone calls during the eMeeting when the phone calls originate from a particular individual or occur during a particular time frame. This negotiation of alternative use restriction guidelines may occur automatically—i.e., without the use of a human moderator—or may involve input from one or more users including the participant and/or one or more moderators. For example, EGE process 12 may determine, based upon review of the participant's calendar that a phone call is scheduled, from a review of the eMeeting invitation that the participant is scheduled to be an important contributor to the eMeeting, and from a review of enterprise hierarchy information that the phone call is to originate from a high-ranking manager of the organization. Accordingly, in some embodiments EGE process 12 may automatically grant the request received from the participant for modification of the use restriction guidelines. As another example, a request for modification of use restriction guidelines may cause EGE process 12 to generate an email, or other communication, to the meeting organizer explaining the requested use restriction guideline changes and requesting approval (or counter-proposal) from the organizer.

EGE process 12 may further receive 112 an indication that a participant has accepted a portion of the one or more use restriction guidelines. In one embodiment a participant may be required to accept all use restriction guidelines in order to participate in the eMeeting. In another embodiment, a participant may be permitted to propose alternative use restriction guidelines, or to accept only some of the use restriction guidelines associated with an eMeeting—e.g., accept restrictions on web browser access but not accept restrictions on email use. Depending on the nature of the eMeeting, the use restriction guidelines, the identity of a participant, and so on, certain use restriction guidelines may be optional while others are mandatory (i.e., the participant cannot join the eMeeting without accepting those use restrictions). Whether a use restriction guideline is mandatory (e.g., whether in general or with respect to a particular participant) may be determined based upon input from the eMeeting organizer (i.e., a moderator), based upon automatic analysis of information associated with the eMeeting (e.g., subject matter, calendar information, participant list, and so on), as well as other information including enterprise hierarchy information 142 associated with a participant or moderator and/or geographical location information 138 associated with a participant or moderator.

EGE process 12 may further enforce 116 a portion of the one or more use restriction guidelines (e.g., the portion accepted by a participant) with respect to one or more electronic devices associated with a participant. Use restriction guidelines may include, for example, restricting access 128 to one or more websites, restricting access 132 to one or more applications, and/or restricting access 134 based upon content. As such, enforcing 116 a portion of the use restrictions may include restricting access 132, 134 to websites, applications, and/or content during the eMeeting. Enforcing 116 use restriction guidelines may also include restricting other aspects of the use of electronic devices. For example, use restriction guidelines may include restrictions on the general use of laptops, cell phones, land-line phones, desktop computers, gaming devices, and so on. Accordingly, applying 116 use restriction guidelines may include disabling or otherwise preventing use of cell phones, land-line phones, desktop computers, gaming devices, and so on.

In one embodiment, EGE process 12 may provide a notification to participants that use restriction guidelines are in effect (and/or are about to be in effect). For example, the desktop of a personal computer may include a small banner message during an eMeeting indicating that certain use restriction guidelines are in effect. Such a notification may be visible for the entirety of an eMeeting or only a portion (e.g., whenever a participant attempts to access a restricted website, application, etc.). Various functionality may be associated with the notification. For example, clicking on a notification banner may provide a user with various options related to the use restriction guidelines, including an option to display the current use restriction guidelines, an option to request an exception to one or more use restriction guidelines, an option to leave the eMeeting in order to access certain computer functionality, and so on.

It may be useful to apply one or more use restriction guidelines only during a certain portion of an eMeeting (e.g., the first twenty minutes of an eMeeting, the lecture portion of an eLearning session but not the Q&A portion of the session, and so on). Accordingly, in one embodiment, EGE process 12 may identify 120 a portion of the eMeeting during which one or more use restriction guidelines will be in effect and enforce 124 the one or more use restriction guidelines only during that portion of the eMeeting. It will be understood that multiple portions may be determined 120 for any given eMeeting during which a variety of use restriction guidelines (and/or combinations of guidelines) may be applied 124, and that portions may be entirely distinct or may coincide or otherwise temporally overlap. It will also be understood that EGE process 12 may identify 120 one portion of an eMeeting associated with one participant in which to apply 124 a particular use restriction guideline, and may identify 120 a different portion of the eMeeting associated with a different participant in which to apply 124 the particular use restriction guideline (or a different guideline). It will also be understood that a portion of an eMeeting may be identified based upon input from a user (e.g., input from the eMeeting organizer) and/or automatically (e.g., through analysis of the current and/or past eMeetings using data mining techniques, artificial intelligence algorithms, and so on).

Referring now also to FIG. 3, an example interface for an eMeeting organizer to provide use restriction guidelines to an EGE process is shown. For example, a moderator, while organizing an eMeeting may be presented with chart-type input interface 200 in which the moderator can designate, by selecting a particular check box which restriction guidelines (e.g., No IM 204, No Email 208, No desk phone 212, and so on) should apply to each eMeeting participant (e.g., Lisa 228, Lucas 232, and so on). As can be seen in FIG. 3, the moderator for this eMeeting has indicated, for example, that participant Lucas 232 should be presented with use restriction guidelines associated with No IM 204, No Email 208, No desk phone 212, and No mobile phone 216. Similarly, the moderator has indicated that the chair of the eMeeting, Lisa 228, should be subject to an Only related software 224 guideline (i.e., should be able to access only software related to the eMeeting). It will be understood that the categories of use restrictions and list of participants in input interface 200 may include options not shown in FIG. 3, may be populated automatically by EGE process 12, may based upon, for example, eMeeting invitee information, eMeeting type, eMeeting subject matter and so on, and/or may be populated based upon input by the moderator or another input source.

The specific nature of the use restriction guidelines presented in input interface 200 may be based upon a standard or default set of use restriction guidelines, including a default set based upon particular eMeeting information or preferences of the eMeeting organizer, and/or may be based upon specific input from the eMeeting organizer or another input source. For example, a moderator may be able to click on Only related software 224 restriction in order to view a list of permitted applications or application functionality and to adjust which applications or application functionality will be affected by this set of use restriction guidelines. Further, EGE process 12 may provide the ability to modify the list of applications or application functionality for a particular individual, such that, for example, the list of permitted applications for participant Lisa 228 may vary from the list of permitted applications for another participant. Similarly, EGE process 12 may allow customization of other use restriction guidelines through input interface 200. For example, by clicking on No IM 204 restriction, a moderator may be permitted to adjust the portion of an eMeeting during which IM discussion is not permitted (e.g., only during the lecture portion of an eLearning session), a list of approved participants among whom instant messages may be exchanged, and so on.

Referring now also to FIG. 4, another example interface for an eMeeting organizer to provide use restriction guidelines to an EGE process is shown. In FIG. 4, input interface 300 may permit a moderator to further indicate the portion of an eMeeting during which one or more use restriction guidelines may apply. For example, a moderator may indicate that the use restriction guidelines should apply during the Entire Meeting 304 for participant Lisa 316, during a customizable Selective Meeting Slot 308 for Jake 320, and for the First 30 Minutes 312 of the meeting for participant Lucas 324. It will be understood that the portions of an eMeeting during which use restrictions apply and the list of participants in input interface 300 may be populated automatically by EGE process 12, based upon, for example, eMeeting invitee information, eMeeting type, eMeeting subject matter and so on, and/or may be populated based upon input based upon input from the moderator or another input source. Further, clicking on a portion of input interface 300 may reveal additional functionality. For example, clicking on the intersection of the Selective Meeting Slot 308 column with the participant Jake 320 row may provide a further input interface (not shown) which permits a moderator to indicate, for example, that the use restrictions should apply to Jake only during the first 10 minutes of the meeting or only during the portion of the meeting when Lucas 324 is also present.

Figure 5:
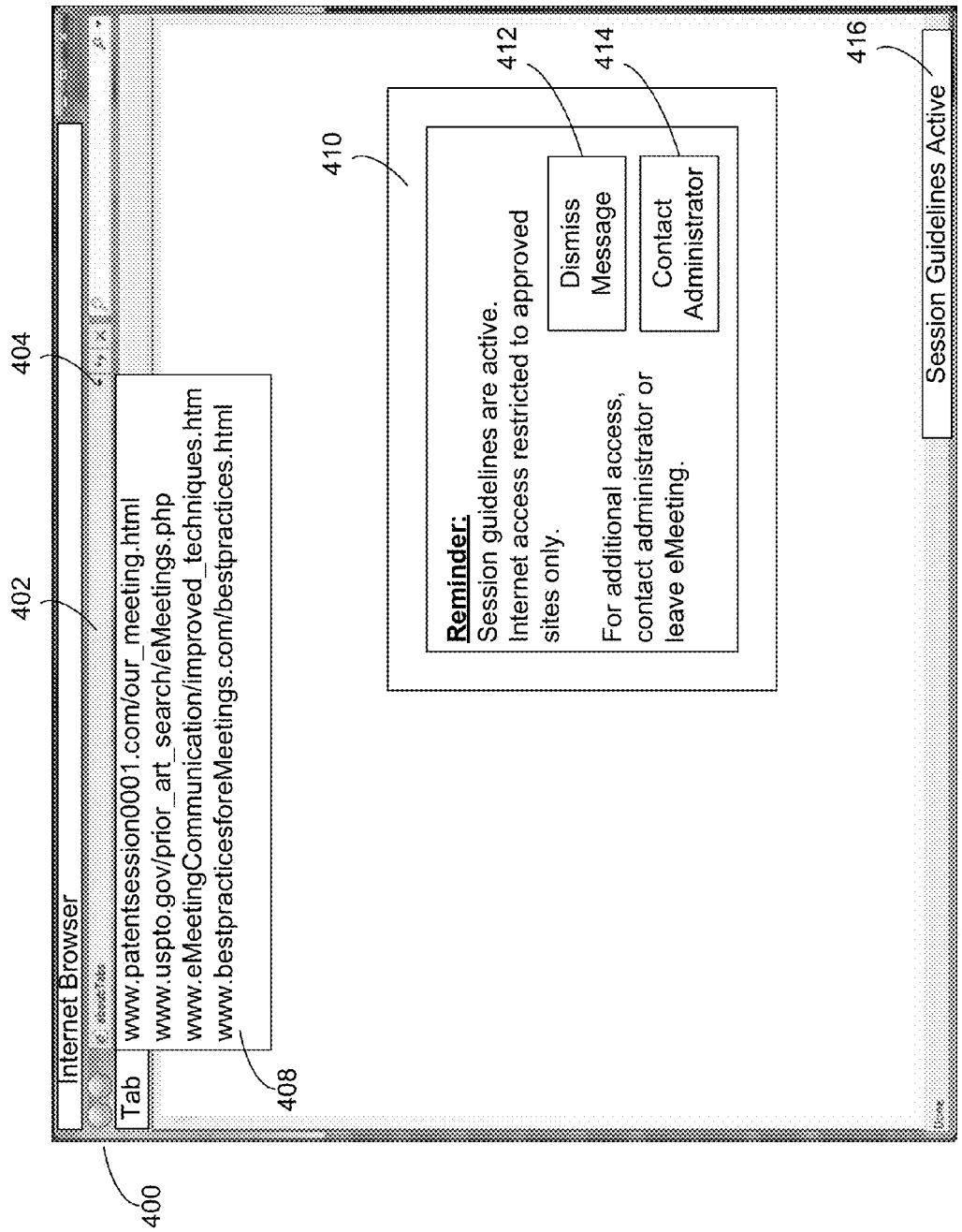
FIG. 5 is a diagrammatic view of a third aspect of an implementation of the eMeeting guideline enforcement process of FIG. 1.
Figure 6:
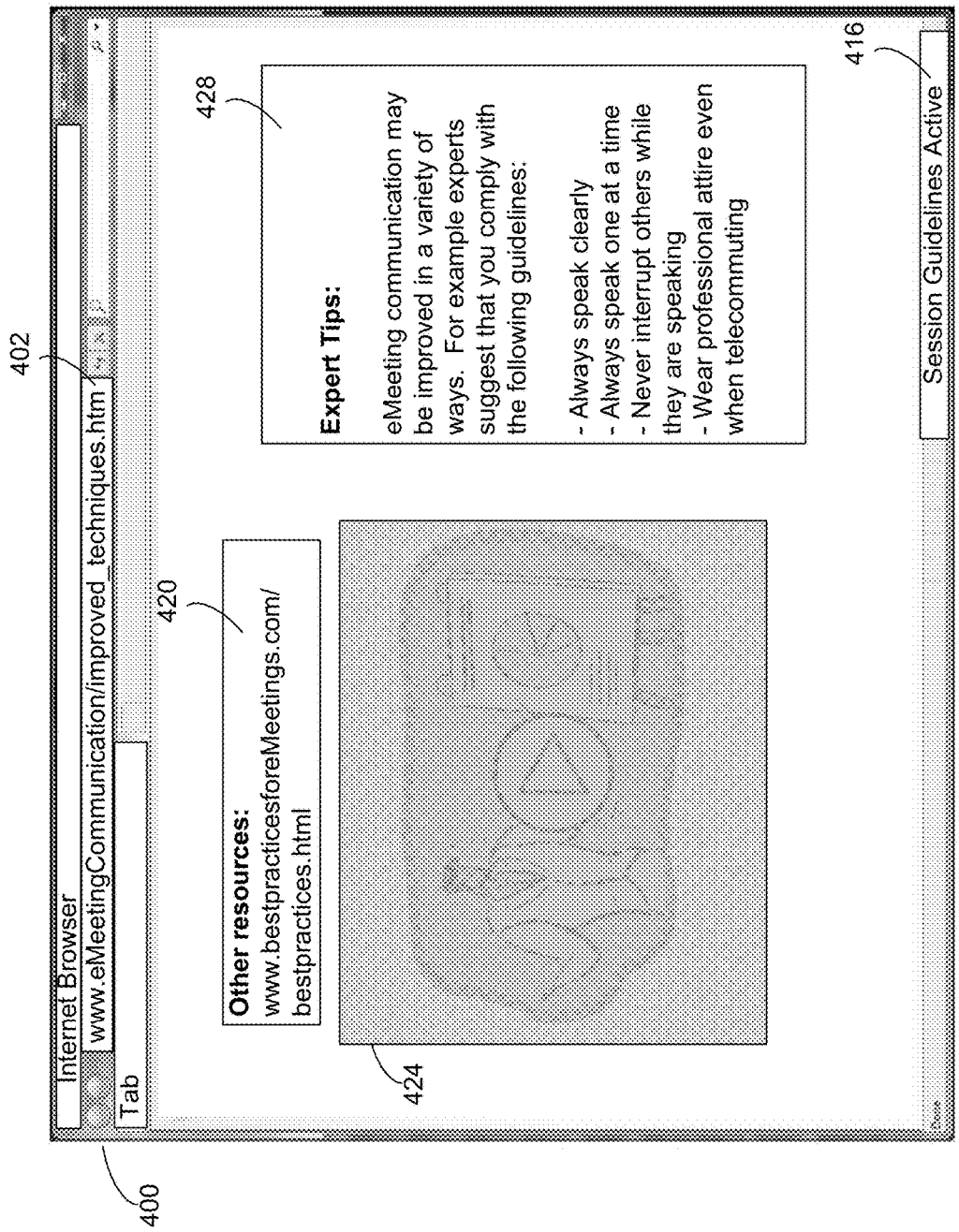
FIG. 6 is a diagrammatic view of a fourth aspect of an implementation of the eMeeting guideline enforcement process of FIG. 1.

Referring now also to FIGS. 5 and 6, an implementation of EGE process 12 with respect to web browser 400 is shown. It can be seen, for example, that a participant in an ongoing eMeeting (e.g., an eMeeting related to the efficiency of eMeetings) may be restricted to a specific set 408 of websites, which may be viewed, for example, by selecting drop-down action icon 404 of address bar 402. A participant may be alerted to the fact that use restriction guidelines are active by indicator banner 416. In one embodiment, clicking indicator banner 416 (or enacting another functional action, e.g., attempting to access a website to which access has been restricted) may cause EGE process 12 to display reminder window 410, which may remind the participant that internet access is restricted to approved websites only, and which may provide options including Dismiss Message 412, Contact Administrator 414, Leave eMeeting (not shown), Close Web Browser (not shown), and so on.

As will be understood from the discussion of this disclosure, use restriction guidelines associated with a particular website may restrict access 128 to only a portion of the website, including restricting access 134 based upon content associated with the website. For example, in the website at www.eMeetingCommunication/improved_techniques.htm 402, a link 420 to another approved website may be accessible, as may be a list 428 of expert tips related to eMeeting communication. EGE process 12 may determine, however, that video content 424 may not be relevant to the current eMeeting or may be overly distracting. Accordingly, participants may be able to view that video content 424 is a part of this website, but may not be able to activate video content 424 (as indicated by the "graying out" of video content 424 in the website display) or may be able to activate video content 424 only during a certain portion of the eMeeting.

Figure 7:
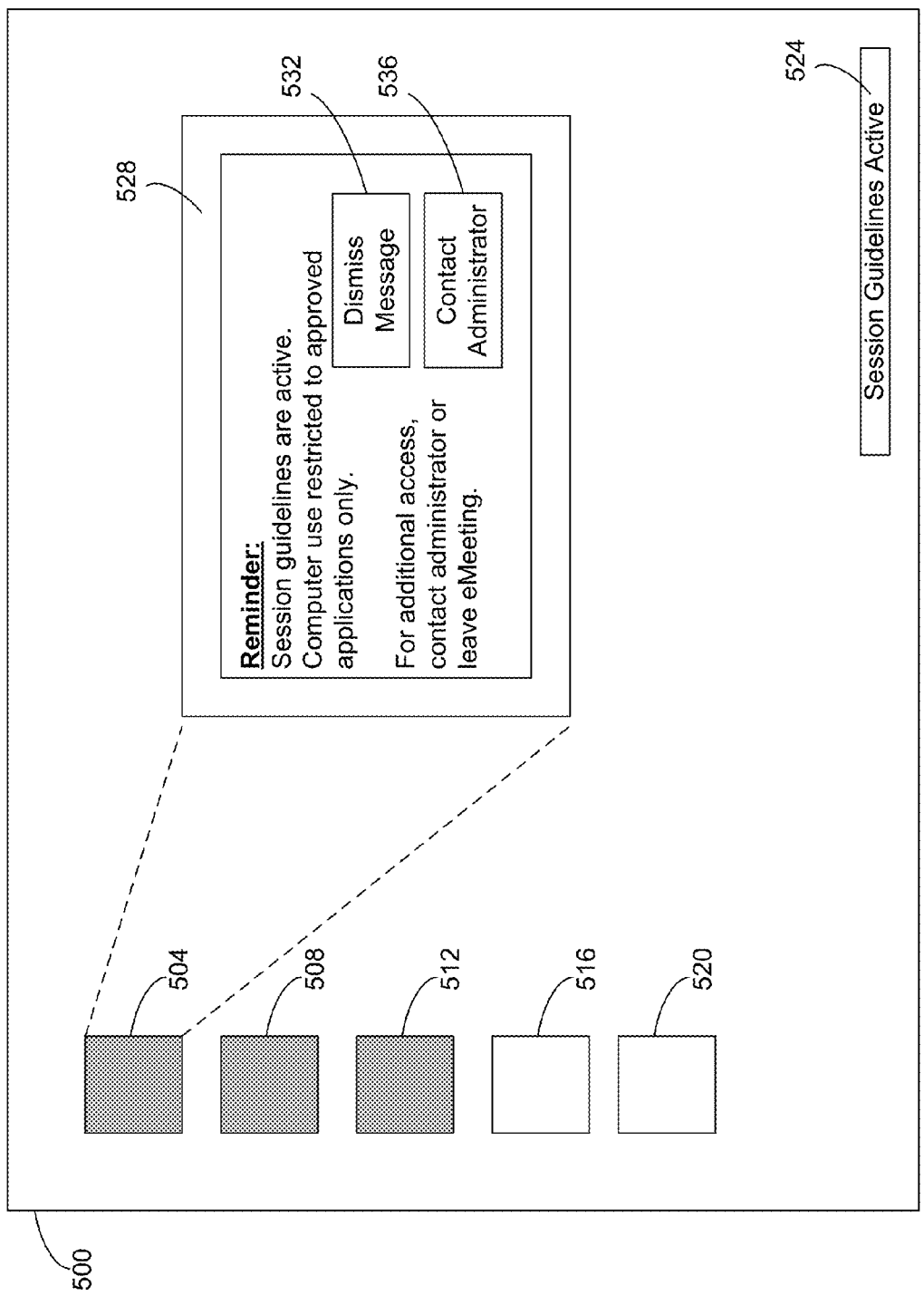
FIG. 7 is a diagrammatic view of a fifth aspect of an implementation of the eMeeting guideline enforcement process of FIG. 1.
Figure 8:
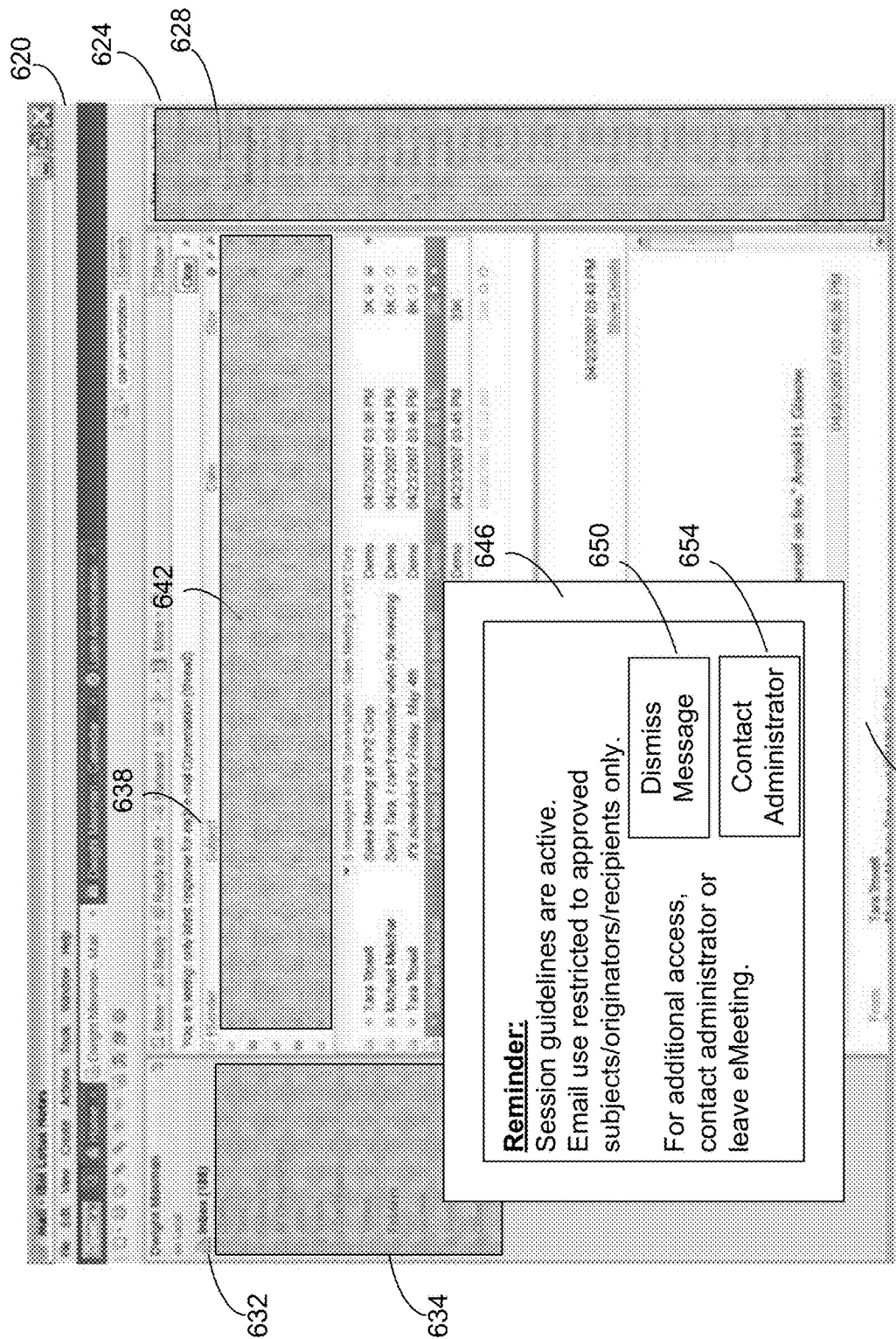
FIG. 8 is a diagrammatic view of a sixth aspect of an implementation of the eMeeting guideline enforcement process of FIG. 1.

Referring now also to FIGS. 7 and 8, an implementation of EGE process 12 with respect to desktop interface 500 is shown. It can be seen that a participant in an ongoing eMeeting, because of certain use restriction guidelines, may be able to access certain applications (or portions of applications), as indicated by application launch icon 516 and application launch icon 520. It can also be seen that a participant may be unable to access certain applications (or portions of applications) as indicated by "grayed out" application launch icons 504, 508, and 512.

Indicator banner 524 may remind the participant that use restriction guidelines are in effect. Further, when a participant engages in a particular action—e.g., clicking on application launch icon 504—EGE process 12 may display reminder window 528, which may alert the participant that access to applications is restricted to approved applications only, and which may provide options including Dismiss Message 532, Contact Administrator 536, Leave eMeeting (not shown), Open Non-Functional (or Partially Functional) Application (not shown), and so on.

As will be understood from the discussion of this disclosure, use restriction guidelines associated with a particular application may restrict access 132 to only a portion of the application's functionality, including restricting access 134 based upon content associated with the application. For example, with respect to email application 620, participants may be permitted to access only certain emails with content associated with the ongoing eMeeting, but may not be permitted to access additional functionality of email application 620. Accordingly, EGE process 12 may cause email application 620 to be displayed with various aspects "grayed out," indicating functionality or content to which access is not currently permitted under the current use restriction guidelines—e.g., Folders 634, messages 642, right sidebar 628, and so on. Opening email application 620, attempting to access "grayed out" content, or another action may result in EGE process 12 displaying reminder window 646, which may alert the participant that access within email application 620 is subject to use restriction guidelines, and which may provide options including Dismiss Message 650, Contact Administrator 654, Leave eMeeting (not shown), and so on.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
   receiving, by one or more computing devices, an indication of one or more use restriction guidelines;
   associating, by the one or more computing devices, the one or more use restriction guidelines with an electronic communication session;
   providing, by the one or more computing devices, the one or more use restriction guidelines to a computing device associated with a first invitee associated with the electronic communication session;
   receiving, by the one or more computing devices, an indication that the first invitee has accepted a portion of the one or more use restriction guidelines;
   identifying, by the one or more computing devices, a portion of the electronic communication session, the portion of the electronic communication session being less than an entirety of the electronic communication session; and
   enforcing, by the one or more computing devices, the portion of the one or more use restriction guidelines with respect to one or more electronic devices associated with the first invitee, wherein determining the one or more use restriction guidelines is based upon, at least in part, ongoing conduct of the first invitee, including enforcing the one or more use restriction guidelines only during the identified portion of the electronic communication session, and not enforcing the one or more use restriction guidelines during a remainder of the electronic communication session, the use restriction allowing viewing incoming email but preventing composing new and response email during the electronic communication session when the incoming email does not include an explicit indication of high importance and the use restriction allowing composing new and response email during the electronic communication session when the incoming email includes the explicit indication of high importance.

2. The computer-implemented method of claim 1 wherein the one or more use restriction guidelines include restricting access to one or more websites.

3. The computer-implemented method of claim 1 wherein the one or more use restriction guidelines include restricting access to one or more applications.

4. The computer-implemented method of claim 1 wherein the one or more use restriction guidelines include restricting access to one or more of one or more websites and one or more applications based upon, at least in part, content associated with one or more of one or more websites and the one or more applications.

5. The computer-implemented method of claim 1 wherein the one or more use restriction guidelines are based upon, at least in part, one or more of geographical location information and enterprise hierarchy information.

6. The computer-implemented method of claim 1 wherein determining the one or more use restriction guidelines is based upon, at least in part, past conduct of one or more of the first invitee and a second invitee.

7. A computer program product residing on a non-transitory computer-readable storage medium having a plurality of instructions stored thereon, which, when executed by a processor, cause the processor to perform operations comprising:
   receiving an indication of one or more use restriction guidelines;
   associating the one or more use restriction guidelines with an electronic communication session;
   providing the one or more use restriction guidelines to a computing device associated with a first invitee associated with the electronic communication session;

receiving an indication that the first invitee has accepted a portion of the one or more use restriction guidelines;

identifying a portion of the electronic communication session, the portion of the electronic communication session being less than an entirety of the electronic communication session; and enforcing the portion of the one or more use restriction guidelines with respect to one or more electronic devices associated with the invitee, wherein determining the one or more use restriction guidelines is based upon, at least in part, ongoing conduct of the first invitee, including enforcing the one or more use restriction guidelines only during the identified portion of the electronic communication session, and not enforcing the one or more use restriction guidelines during a remainder of the electronic communication session, the use restriction allowing viewing incoming email but preventing composing new and response email during the electronic communication session when the incoming email does not include an explicit indication of high importance and the use restriction allowing composing new and response email during the electronic communication session when the incoming email includes the explicit indication of high importance.

8. The computer program product of claim 7 wherein the one or more use restriction guidelines include restricting access to one or more websites.

9. The computer program product of claim 7 wherein the one or more use restriction guidelines include restricting access to one or more applications.

10. The computer program product of claim 7 wherein the one or more use restriction guidelines include restricting access to one or more of one or more websites and one or more applications based upon, at least in part, content associated with one or more of the one or more web sites and the one or more applications.

11. The computer program product of claim 7 wherein the one or more use restriction guidelines are based upon, at least in part, one or more of geographical location information and enterprise hierarchy information.

12. The computer program product of claim 7 wherein determining the one or more use restriction guidelines is based upon, at least in part, past conduct of one or more of the first invitee and a second invitee.

13. A computer system comprising:

at least one processor;

at least one memory architecture coupled with the at least one processor;

a first software module executable by the at least one processor and the at least one memory architecture, wherein the first software module is configured to receive an indication one or more use restriction guidelines;

a second software module executable by the at least one processor and the at least one memory architecture, wherein the second software module is configured to associate the one or more use restriction guidelines with an electronic communication session;

a third software module executable by the at least one processor and the at least one memory architecture, wherein the third software module is configured to provide the one or more use restriction guidelines to a computing device associated with a first invitee associated with the electronic communication session;

a fourth software module executable by the at least one processor and the at least one memory architecture, wherein the fourth software module is configured to receive an indication that the first invitee has accepted a portion of the one or more use restriction guidelines;

a fifth software module executable by the at least one processor and the at least one memory architecture, wherein the fifth software module is configured to identify a portion of the electronic communication session, the portion of the electronic communication session being less than an entirety of the electronic communication session; and a sixth software module executable by the at least one processor and the at least one memory architecture, wherein the sixth software module is configured to enforce the portion of the one or more use restriction guidelines with respect to one or more electronic devices associated with the first invitee, wherein determining the one or more use restriction guidelines is based upon, at least in part, ongoing conduct of the first invitee, including enforcing the one or more use restriction guidelines only during the identified portion of the electronic communication session, and not enforcing the one or more use restriction guidelines during a remainder of the electronic communication session, the use restriction allowing viewing incoming email but preventing composing new and response email during the electronic communication session when the incoming email does not include an explicit indication of high importance and the use restriction allowing composing new and response email during the electronic communication session when the incoming email includes the explicit indication of high importance.

14. The computer system of claim 13 wherein the one or more use restriction guidelines include restricting access to one or more of one or more websites and one or more applications.

15. The computer system of claim 13 wherein the one or more use restriction guidelines include restricting access to one or more of one or more websites and one or more applications based upon, at least in part, content associated with one or more of the one or more websites and the one or more applications.

16. The computer system of claim 13 wherein the one or more use restriction guidelines are based upon, at least in part, one or more of geographical location information and enterprise hierarchy information.

17. The computer system of claim 13 wherein determining the one or more use restriction guidelines is based upon, at least in part, past conduct of one or more of the first invitee and a second invitee.

\* \* \* \* \*